April 25, 1967 R. DE VOGHEL 3,315,975
STEERING DIFFERENTIAL FOR TOWED VEHICLES OR AUTOMOBILES
Filed Jan. 13, 1965

INVENTOR
RAYMOND DE VOGHEL
BY
John J. Hart
ATTORNEY

United States Patent Office 3,315,975
Patented Apr. 25, 1967

3,315,975
STEERING DIFFERENTIAL FOR TOWED
VEHICLES OR AUTOMOBILES
Raymond de Voghel, Marcinelle, Belgium, assignor to Societe Anonyme Glaverbel, Brussels, Belgium, a Belgian company
Filed Jan. 13, 1965, Ser. No. 425,243
Claims priority, application Belgium, Jan. 28, 1964, 515,961, Patent 643,086
12 Claims. (Cl. 280—91)

Applicant's copending application Serial No. 294,813 filed May 15, 1963 (now Patent No. 3,235,283) relates to a steering differential for towed or trailed vehicles or automobiles comprising, as its essential element, two pairs of cranks, the cranks of each pair being interconnected by a rod which is articulated to the crank pins of the said cranks and the length of which is equal to that of the arms of the said cranks. One of the cranks of each pair rotates about a common shaft and the other crank of each pair rotates about a further shaft which is coaxial or parallel to the first shaft, in this case about one of the two output shafts each of which controls the deflection of the steerable wheel on one side of the vehicle or of the steerable wheels on one side of the vehicle if the latter has more than two steerable wheels.

In the copending application, it is stated that the said steering differential permits unlimited deflection of the steerable wheels, mounted preferably on vertical pivots, and that the differentiation in the deflection of the wheels may be effected, at will, in such manner that the planes of all the steerable wheels are normal to straight lines meeting in the turning or cornering centre, thus permitting the vehicle to advance in accordance with a curved line of any desired nature or along a straight line in the direction of the median, longitudinal axis of the vehicle, or in such manner that the planes of the wheels, all of which are steerable, remain constantly parallel to each other, permitting the vehicle to advance in a straight line in any desired direction which is also modifiable at any instant.

The present invention relates to a steering differential of this type and which comprises two shafts which are offset relatively to each other and each of which carries two cranks one of which is loose or idle and the other of which is fixed, and which are associated with different pairs of cranks. The said shafts are output shafts each of which controls the deflection of the steerable wheel or wheels on one side of the vehicle.

According to the invention, the two cranks rotating idly on their output shafts are each incorporated in a toothed wheel meshing with a pinion mounted on a shaft the rotation of which is controlled by the steering wheel. One of the cranks fixed on their output shaft is incorporated in a toothed wheel, whereas the other is directly keyed on its output shaft. The latter carries furthermore a fixed toothed wheel. This constitutes an assembly in which each output shaft carries two wheels, one of which is loose whereas the other is fixed, and each wheel meshes with a pinion carried on the shaft controlled by the steering wheel, and is capable of driving the wheel.

According to one of the embodiments of the copending application, the cranks are already incorporated in toothed wheels adapted to be driven by pinions. However, contrary to the present invention, wherein the cranks or the tooth wheels which replace them rotate in the manner described hereinabove on the two offset output shafts, in the embodiment of the copending application the toothed wheels rotate on three shafts, two of which are coaxial and constitute the output shaft, whereas the third, which is offset relatively to the others, constitutes an intermediate shaft carrying two wheels, one loose and the other fixed, whereas the wheels on the output shafts are fixed.

The elimination of the said third shaft has the advantage that it simplifies the design and construction and provides a particularly compact steering differential.

According to the present invention, the pinions rotate freely on the shaft controlled by the steering wheel and comprise members permitting the coupling to the said shaft, at will, either of the two pinions meshing with the toothed wheels which are loose on the output shafts or the two pinions meshing with the toothed wheels which are fixed on the output shafts. The shaft whose rotation is controlled by the steering wheel is advantageously adapted to slide axially between two limits and carries two keys adapted to be displaced in a groove formed in the pinions when the grooves in the different pinions are aligned for this purpose. In this way, it becomes possible to put in engagement either the pinions of the toothed wheels which are loose on the output shafts, so as in this manner to differentiate the deflection of the steerable wheels in such manner that the vehicle is able to advance in a straight line along its longitudinal, median axis or in accordance with a curve of any desired nature, or the toothed wheels which are fixed on the output shafts, so as to impart an identical deflection to all the wheels in such manner as to maintain them parallel to each other so that the vehicle is able to advance rectilinearly in any desired direction which can be modified at will.

The steering differential comprises furthermore a lever which is articulated on the vehicle chassis and which terminates in a fork comprising pins engaging in a circular groove formed in a roller fixed on the shaft controlled by the steering wheel. The said lever permits the displacement of the said shaft from one to the other of the axial sliding limits. Keyed on one of the output shafts is a disc formed with a radial slot and secured on the lever producing the sliding of the shaft controlled by the steering wheel is a spur. The said disc and the said spur co-operate in such manner that the latter impinges on the disc and prevents the displacement of the lever when the steerable wheels are deflected and the spur is positioned opposite the radial slot in the disc when the steerable wheels are parallel, so as to permit the vehicle to advance in a straight line along its median, longitudinal axis. In this position, it is possible to actuate the lever, the spur being able to pass through the slot and take up a position on the other side of the disc so as to again prevent the displacement of the lever as soon as the steerable wheels have been deflected. The engagement grooves in the pinions are arranged in such manner that they are aligned when the spur of the lever is opposite the disc slot.

In a practical embodiment of the steering differential according to the present invention, the loose toothed wheels are advantageously carried on hub prolongations keyed on the output shafts, in this case one in respect of the prolongation of the hub of a fixed wheel and the other in respect of the prolongation of the hub of the crank fixed on the other output shaft. Furthermore, the discs replacing the spokes of the wheels are preferably offset towards the edges of the wheels so as to provide, between the wheels rotating near each other, the space necessary for the rods of the pairs of cranks and for the movements of the said rods. Since the latter are guided by the discs of the wheels, they can be assembled on the crank-pins without the assistance of securing means such as nuts or securing rings. The assembly constitutes an extremely compact device which is disposed in a housing of reduced dimensions.

A multiplicity of embodiments of the invention are illustrated, by way of example, in the accompanying drawings, wherein.

Figure 1:
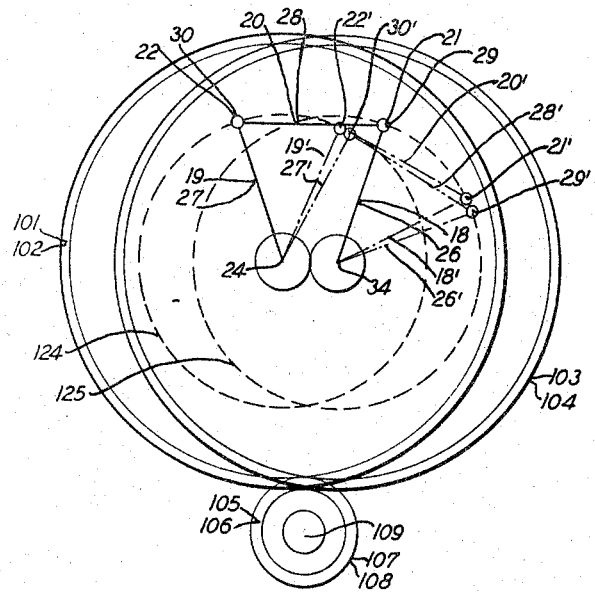
FIGURE 1 shows, diagrammatically, the two pairs of cranks with their rods, and also the functioning thereof.

In order to facilitate understanding of the invention, the output shafts, cranks, pins and rods have been given the same reference numerals as in the copending application. Furthermore, reference will be made to the text and to the figures of such copending application for all matter concerning the steerable wheels and the various deflections thereof which are possible (FIGURES 1 to 9), and also with regard to the transmission of the differentiation of the output shafts to the steerable wheels (FIGURES 15 and 16).

Figure 2:
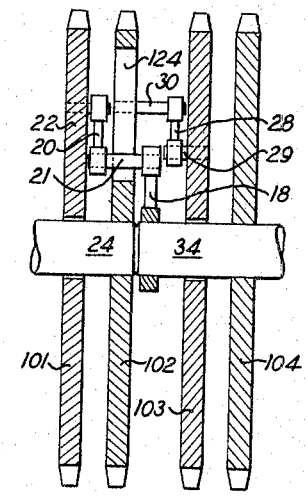
FIGURE 2 is a diagrammatic sectional view of the toothed wheels of a steering differential according to the invention.

In accordance with the principle on which the invention is based, the shafts 24 and 34 are offset relatively to each other and constitute output shafts controlling the differentiated deflection of the steerable wheels of the vehicle. About each one of the said shafts rotate the cranks of the two pairs of cranks, those of each pair being connected together by a connecting rod having the same length as the cranks. One of the cranks of each output shaft is fixed and the other is loose. Thus, there is secured on the shaft 34 the crank 18 having a pin 21 to which is connected one end of the connecting rod 20 which is articulated at its other end to the pin 22 of a crank 19 (FIGURE 1) incorporated in a toothed wheel 101 rotating loosely on the output shaft 24. Similarly, there is fixed on the shaft 24 the crank 27 (FIGURE 1) incorporated in a toothed wheel 102 in FIGS. 1 and 2 having a pin 30 to which is connected one end of the connecting rod 28 extending to the pin 29 of the crank 26 (FIGURE 1) incorporated in a toothed wheel 103 which is loose on the shaft 34 (note FIG. 2). The said shaft 34 carries furthermore a fixed toothed wheel 104. Thus the output shaft 24 carries the loose wheel 101 and the fixed wheel 102 and the output shaft 34 carries the loose wheel 103 and the fixed wheel 104, and also the crank 18 which is directly secured thereto, as shown in FIGURE 2.

Figure 3:
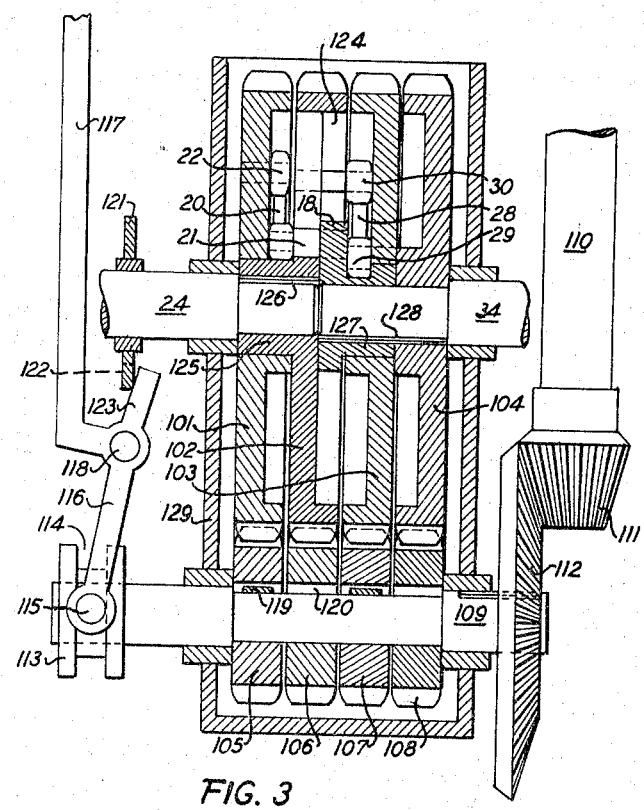
FIGURE 3 is a sectional view of a practical embodiment of the said differential.

Each toothed wheel 101 to 104 meshes with one of the four pinions 105 to 108 (FIGURES 1 and 3) rotating idly on a shaft 109, but they are adapted to be coupled to the said shaft, in such manner that either the pinions 105 and 107 drive the loose wheels 101 and 103, or the pinions 106 and 108 drive the wheels 102 and 104 fixed on the shafts. The shaft 109 is driven in rotation by a shaft 110 carrying the steering wheel (not shown), for example through the agency of conical pinions 111 and 112 (FIGURE 3). It is furthermore adapted to carry out a limited axial sliding movement and for this purpose it carries a roller 113 having a circular groove 114 engaged in which are the pins 115 of a fork 116 forming a part of a lever 117 pivotally mounted at 118 on the chassis of the vehicle.

The means for engaging the pinions on the shaft 109 illustrated in FIGURE 3 comprises two keys 119 fast with the shaft and adapted to be displaced in the grooves 120 formed in the pinions, one of the keys being capable of engaging either with the pinions 105 or 106 and the other either with the pinions 107 or 108. In order that the keys may be displaced only when the steerable wheels are in a predetermined poistion, i.e. all parallel to the median longitudinal axis of the vehicle, one of the output shafts, in this case the shaft 24, has keyed on it a disc 121 formed with a radial slot 122, and the lever 117 is provided with a spur 123 impinging against one face of the disc 121 so as to prevent the actuation of the lever when the steerable wheels are deflected. When the steerable wheels are parallel to each other and to the median longitudinal axis of the vehicle, the spur is disposed in alignment with the slot 122, so that it is possible to actuate the lever, the spur then passing through the said slot to the other side of the disc. The spur will then impinge against the other face of the disc when the steerable wheels are again deflected.

For reasons discussed in the copending application, the connecting rods 20 and 28 must, in the case of the present invention, be disposed on the same side of the plane extending through the axes of the output shafts 24 and 34, and the steerable wheels of the vehicle are parallel to the longitudinal median axis of the vehicle when the rods are themselves parallel to each other and also parallel to the plane of the two output shafts. In this position, the rods 20 and 28 are superposed in FIGURE 1, as are the cranks 18, 26 and 19, 27 (or, in the present case, the outlines of the arms of the said cranks when they are incorporated in the toothed wheels), and also the pins 21, 29 and 22, 30. These superpositions cease when a rotation through an angle of any desired magnitude is imparted to the toothed wheels 101-104.

In the position in which the loose toothed wheels 101 and 103 are adapted to be driven by the pinions 105 and 107, then coupled to the shaft 109 (as shown in FIGURE 3), it will be found that the angular movement of the toothed wheel 101 displaces the pin 22 (FIGURE 1) through an arc of the circle 124 at 22'. During this displacement, the pin 22 "urges," through intermediary of the rod 20, the pin 21 of the crank 18, and the said pin 21 describes an arc on the circle 125, in order to take up its position at 21'. Since the crank 18 is keyed on the shaft 34, the latter is compelled to effect an angular movement identical with that of the crank 18 and of the crank pin 21. On the other hand, the toothed wheel 103, and with it the crank pin 29, have been compelled to effect an angular movement identical with that of the toothed wheel 101 and of the crank pin 22, since the two wheels are driven simultaneously by their pinions. The crank pin 29 is then displaced in accordance with an arc of a circle 125 to 29' and, in so doing, it "draws" through the agency of the rod 28, the crank pin 30 to 30'. Since the crank pin 30 is fixed in the wheel 102 fixed on the shaft 24, the latter is obliged to carry out an angular movement identical with that of the pin 30. For the reasons discussed in the copending application, and as can be seen from FIGURE 1, the angular movement effected by the "urged" pin 21 and by the "drawn" pin 30 are not identical and the shafts 24 and 35 have undergone differentiated movements relating to the orientation of the steerable wheels of the vehicle, thus permitting the latter to advance either in a straight line along its median longitudinal axis or to described a curve of any desired magnitude, as shown in FIGURES 2 to 6 of the copending application.

In the arrangement according to the present invention, the pin 21 of the crank 18 extends through the toothed wheel 102 through a window 124 formed for this purpose in the said wheel and so dimensioned as to permit all the desired differentiated deflections.

If the lever 117 is actuated (FIGURE 3), of course after having disposed the connecting rods 20 and 28 parallel to each other (as shown in full line in FIGURE 1) in such manner as to position the radial slot 122 opposite the spur 123, the shaft 109 is caused to slide axially and the keys 119 then couple the pinions 106 and 108, driving the toothed wheels 102 and 104 fixed on their output shafts 24 and 34. It is clear that the two toothed wheels 102, 104 carry out the same angular movement controlled by the shaft 110 of the steering wheel and that the output shafts 24, 34, on which such toothed wheels are fixed (as just stated), also undergo the same angular movement. Thus, their rotation is no longer differentiated and the deflection of all the steerable wheels is effected in accordance with the same angle. In order that the deflection of the steerable wheels may be effected in the same direction and that the planes of the steerable wheels may remain parallel to each other (FIGURE 9 of the copending application), it should be added that the direction of rotation of the pivots of the steerable wheels on one of the sides of the vehicle must be reversed, as discussed in the copending application and shown notably in FIGURE 1 of the latter or described in the explanatory matter relating to FIGURE 17 of such application. In the present invention, this reversal may be effected by a similar means (not shown) but which is controlled by the lever 117. It should also be pointed out that, during the entire period of time that the pinions 106 and 108 are coupled, the crank 18 and the pinion 106 of the wheel 102 drive the connecting rods 20 and 28 which cause the lose wheels 101 and 103 to follow, in such manner that the relative position of the wheels is maintained and the connecting rods become parallel to each other each time that the planes of the steerable wheels are parallel to the median longitudinal axis and the shaft 117 is capable of being actuated.

In order to obtain, with the aid of the steering differential thus described, a differentiation in the movements of the output shafts 24 and 34 which corresponds substantially to the deflection of the steerable wheels, it is necessary to suitably select the ratios of the elements of the steering differential. Since the length of the arm of the crank or the distance between the axis of the output shaft and the axis of the pins secured in the toothed wheels (identical to each other and normally identical also with the length of the connecting rods) is conditioned by the dimensions imposed in respect of the differential housing, the adaptation of the latter to a vehicle of given dimensions (ratio between the spacing and the base of the wheels) will preferably be effected by an appropriate selection of the offsetting of the output shafts 24 and 34.

The steering differential according to the invention is suitable both for symmetrical vehicles and for non-symmetrical vehicles, wherein the wheel base on one side of the vehicle differs from that of the wheels on the other side (FIGURES 7 and 8 of the copending application). In the case of symmetrical vehicles, the cranks and the rods of the two pairs of cranks will all be of uniform length, whereas in the case of a non-symmetrical vehicle the length of the elements of the two pairs of cranks will vary in relationship with the difference between the wheel bases.

FIGURES 2 and 3 show the same steering differential, one of the figures being diagrammatic and referring to the toothed wheels whereas the other shows a practical embodiment. In order to facilitate the understanding of the figures and in order to more simply show the elements of the pairs of cranks, the latter have been shown differentiated after an angular movement of the wheels 101 and 103 through 30° in the case of FIGURE 2 and through 45° in the case of FIGURE 3. It will also be noted that, in the two figures, what is concerned is an assembly of sections through different vertical, parallel planes. Thus, the shaft 24 with the toothed wheels 101 and 102 and the disc 121 are shown in section taken along a plane extending through the axis of the shaft 24, and the shaft 34 with the crank 18 and the toothed wheels 103 and 104 are shown in section taken along a plane extending through the axis of the shaft 34, whereas the pinions 105 to 108 are shown in a section taken along a plane extending through the axis of the shaft 109 and shown furthermore in the non-differentiated position, so as to show the keys 119 in the aligned grooves 120.

In the embodiment according to FIGURE 3, the loose toothed wheels 101 and 103 are carried on hub prolongations keyed on the output shafts, the toothed wheel 101 in respect of the prolongation 125 of the hub of the wheel 102 being keyed by a key 126 on the end of the output shaft 24, and the toothed wheel 103 in respect of the prolongation 127 of the hub of the crank 18 being secured by a key 128 on the end of the output shaft 34; the said key 128 also keys the toothed wheel 104 on the output shaft 34.

The toothed wheels 101 and 103 preferably comprise solid discs which are laterally offset, thus providing the space necessary for the connecting rods 20 and 28 between the wheels rotating in the immediate proximity of each other. Since the said connecting rods are laterally guided by such discs of the toothed wheels, it suffices to engage them on their crank pins, only the crank pin 21 being provided with a lateral bearing face. In view of the absence of any kind of screw, clamping ring or other securing element, the assembly and disassembly of the said steering differential are extremely easy. The wheels 101 and 103 are of identical construction, so that they may be transposed during re-assembly.

The result is an extremely compact device which can be disposed in a housing 129 of small dimensions.

Of course, the invention is not limited to the embodiment described and illustrated by way of example; the scope of the invention would not be exceeded if modifications were to be made.

I claim:

1. A differential steering arrangement for a drawn or self-propelled vehicle having at least one pair of steerable wheels, and means for steering such wheels, comprising a pair of steering shafts associated with said steerable wheels, said shafts having their longitudinal axes substantially parallel to each other and offset laterally from each other, and means connected to the inner ends of said shafts for controlling the deflection of the steerable wheels, including a first pair of cranks, one of which is a fixed crank secured to one of said steering shafts and the other of which is an idler crank freely rotatable about the other of said steering shafts, and a rod connecting the pins of said cranks, a second pair of cranks, one of which is a fixed crank secured to said other steering shaft and the other of which is an idler crank freely rotatable about said one steering shaft, and a rod connecting the pins of said second pair of cranks, and means operatively connecting the like cranks of said pairs thereof in driven relation to said steering means.

2. The combination defined in claim 1, in which said operatively connecting means comprises a first idler gear connected to said idler crank of said first pair of cranks and freely rotatable therewith about said other steering shaft, a first fixed gear connected to said fixed crank of said first pair and secured to said one steering shaft, a second idler gear connected to said idler crank of said second pair of cranks and freely rotatable therewith about said one steering shaft, and a second fixed gear connected to said fixed crank of said second pair and secured to said other steering shaft, and means selectively connecting said idler and fixed gears to said steering means.

3. The combination defined in claim 2, in which said idler crank of said first pair of cranks is incorporated in said first idler gear, and in which said idler crank of said second pair of cranks is incorporated in said second idler gear.

4. The combination defined in claim 3, in which opposed faces of said idler gears are recessed, and in which the pins of the cranks incorporated in said idler gears and the rods connected thereto are substantially contained in said recesses.

5. The combination defined in claim 2, in which one of said fixed cranks of said pairs thereof is incorporated in one of said fixed gears, and in which the other of said fixed cranks of said pairs thereof is directly connected to its associated steering shaft.

6. The combination defined in claim 5 in which said one fixed gear in which is incorporated a fixed crank, is provided with a window, the pin of said other fixed crank directly connected to its associated steering shaft extending through said window and the latter being of a configuration to permit such crank pin to take all the differentiated positions with relation to one fixed gear.

7. The combination defined in claim 5, in which said one fixed gear in which is incorporated a fixed crank and said other fixed crank directly connected to its associated steering shaft are each provided with a hub prolongation, and in which said idler gears are rotatably mounted on said hub prolongations.

8. The combination defined in claim 5, in which a face of said one fixed gear in which is incorporated a fixed crank is recessed, and in which said other fixed crank directly connected to its associated steering shaft is substantially contained in said recess.

9. The combination defined in claim 2, in which said selective connecting means comprises a shaft drivenly connected to said steering means, a pinion for each of said fixed and idler gears rotatably mounted on said driven shaft, and means for alternately connecting the two pinions for said idler gears and the two pinions for said fixed gears to said driven shaft.

10. The combination defined in claim 9, in which each of said pinions is provided with a transverse groove in the hub thereof, and in which said driven shaft is longitudinally displaceable to either of two positions relative to said pinions and is provided with a pair of spaced keys which are slidable on the grooves of said pinions during such movements of the shaft and which are located in the grooves of two of said pinions in each of the two positions of said longitudinally displaceable shaft.

11. The combination defined in claim 9, in which said driven shaft is longitudinally displaceable relative to said pinions, and in which said alternate connecting means comprises a lever pivotally mounted on a fixed part of the vehicle, means connecting said lever to said driven shaft, said lever being operable to longitudinally displace said driven shaft through such connecting means, and means controlling the operation of said lever.

12. The combination defined in claim 11, in which said controlling means comprises a member secured to one of said steering shafts and having a control element whose position depends on the angularly displacement of said shaft from a given position corresponding to a given position of the steerable wheels, and a control element on said lever and cooperative with said member control element to prevent movement of said lever such as to displace said driven shaft when said steering shaft is angularly displaced from said given position.

References Cited by the Examiner
UNITED STATES PATENTS

| | | | |
|---|---|---|---|
| 1,748,061 | 2/1930 | Claude | 280—93 |
| 2,708,848 | 5/1955 | Hohenner | 74—67 |
| 2,741,169 | 4/1956 | Weiss | 74—66 |
| 2,756,066 | 7/1956 | Ludowici | 280—91 |
| 2,834,605 | 5/1958 | McCollough | 280—91 |

KENNETH H. BETTS, *Primary Examiner.*